(12) United States Patent
Wai et al.

(10) Patent No.: US 7,177,330 B2
(45) Date of Patent: Feb. 13, 2007

(54) METHOD AND APPARATUS FOR CONTROLLING THE POLARIZATION OF AN OPTICAL SIGNAL

(75) Inventors: Ping-kong Alexander Wai, Kowloon (HK); Hwa Yaw Tam, Kowloon (HK); Lai Yin Simon Chan, Kowloon (HK); Weng Hong Chung, Kowloon (HK)

(73) Assignee: Hong Kong Polytechnic University, Kowloon (HK)

( * ) Notice: Subject to any disclaimer, the term of this patent is extended or adjusted under 35 U.S.C. 154(b) by 156 days.

(21) Appl. No.: 10/388,598

(22) Filed: Mar. 17, 2003

(65) Prior Publication Data
US 2004/0184491 A1 Sep. 23, 2004

(51) Int. Cl.
*H01S 3/098* (2006.01)
*H01S 3/10* (2006.01)

(52) U.S. Cl. .............................. 372/27; 372/18; 372/19

(58) Field of Classification Search .................... 372/9, 372/18, 19, 27, 25, 30, 43, 68
See application file for complete search history.

(56) References Cited

U.S. PATENT DOCUMENTS

| 4,172,775 | A | * | 10/1979 | Donohue | ............... 204/157.41 |
| 4,730,328 | A | * | 3/1988 | Miyauchi et al. | ............. 372/46 |
| 4,977,561 | A | * | 12/1990 | Ibe et al. | ...................... 372/23 |
| 5,912,756 | A | * | 6/1999 | Ryu | ........................... 398/202 |
| 6,889,008 | B2 | * | 5/2005 | Ogusu | ......................... 398/91 |
| 2001/0004290 | A1 | * | 6/2001 | Lee et al. | ................... 359/124 |

* cited by examiner

*Primary Examiner*—Armando Rodriguez
(74) *Attorney, Agent, or Firm*—Jackson Walker, LLP

(57) ABSTRACT

A method of controlling the state of polarization of an optical signal includes injecting the optical signal into a laser diode and matching the wavelength of the optical signal to a longitudinal mode of the laser diode. A stabilizer signal can also be injected in to the laser diode. The wavelength of the stabilizer signal is matched a first longitudinal mode of the laser diode a longitudinal mode of the laser diode to the optical signal.

9 Claims, 9 Drawing Sheets

METHOD AND APPARATUS FOR CONTROLLING THE POLARIZATION OF AN OPTICAL SIGNAL

BACKGROUND OF THE INVENTION

1. Field of the Invention

The invention relates to controlling the polarization of an optical signal including data signals. In particular the invention relates to a method and apparatus for controlling the polarization state of a laser.

2. Background Information

Real-time polarization control of optical signals is vital for the deployment of optical communications and switching applications as well as wavelength conversion and similar applications.

Current approaches for polarization control typically consist of a polarization rotation unit and a feedback control unit. The polarization rotation is implemented either electro-optically using faraday rotators, micro-electro-mechanical systems (MEMS), liquid crystal waveplates, Lithium Niobate waveguides and segments of polarization maintaining (PM) fibers or thermal-optically using polymer waveguides. These devices, however, cannot control a rapidly varying State of Polarization (SOP) because the feedback control time scale is in nanoseconds.

SUMMARY OF THE INVENTION

It is an object of the present invention to provide an all-optical method of controlling the polarization state of a return-to-zero or non-return-to-zero optical signal in either continuous wave or pulse mode form.

It is a further object of the present invention to provide a method of controlling the polarization state of an optical signal that overcomes or ameliorates disadvantages with known polarization methods or at least to provide the public with a useful alternative.

According to a first aspect of the invention there is provided a method of controlling the state of polarization of an optical signal including injecting the optical signal into a laser diode, wherein the wavelength of the optical signal matches a longitudinal mode of the laser diode.

According to a second aspect of the invention there is provided a method of controlling the state of polarization of an optical signal having a first wavelength including injecting the optical signal into a laser diode and injecting a stabilizer signal having a second wavelength into the laser diode, wherein the fist wavelength matches a first longitudinal mode of the laser diode and the second wavelength matches a second longitudinal mode of the laser diode.

According to a third aspect of the invention there is provided a apparatus for controlling the state of polarization of an optical signal including:
 an input for receiving an optical signal,
 an output for a polarization controlled signal,
 a laser diode,
 a light transmission path from the input to the laser diode,
 separator positioned in the light transmission path for separating the polarization controlled signal from the optical signal and directing it to output.

Preferably, the apparatus further includes a optical signal source for providing a continuous wave optical signal, wherein the continuous wave optical signal is introduced into the transmission path between the input and the separator.

Further aspects of the invention will become apparent from the following description, which is given by way of example only.

The following abbreviations are used in the description and drawings.
 Amp. Electrical Amplifier
 ATT Attenuator
 BERT Bit Error Rate Tester
 BPF Bandpass Filter
 CIR Circulator
 CLK Clock
 COUP Intensity Coupler
 CW Continuous wave
 DFB Distributed Feedback Laser
 DOP Degree of Polarization
 EDFA Erbium Doped Fiber Amplifier
 FP-LD Fabry-Perot Laser Diode
 ISO Optical Isolator
 MEMS micro-electro-mechanical system
 MILD Mutual Injection-locked Laser Diode
 MOD Intensity Modulator
 NRZ non return to zero
 OD Variable Optical Delay-Line
 OSA Optical Spectrum Analyzer
 PC Polarization Controller
 PD Photodetector
 Pol. Polarizer
 PPG Pulse Pattern Generator
 PS Polarization Scrambler
 RZ return to zero
 SMF Single Mode Fiber
 SMSR side-mode suppression ratio
 SOP State of Polarization
 TE Transverse electric
 TEC Thermo-Electric Cooler
 TL Tunable Laser
 TM Transverse magnetic
 Trig Trigger
 VA Variable Attenuator
 WDM Wavelength Division Multiplexer

BRIEF DESCRIPTION OF THE DRAWINGS

Examples of the invention will now be described with reference to the accompanying drawings.

DESCRIPTION OF THE PREFERRED EMBODIMENTS

The state-of-polarization of an optical signal is stabilized by single wavelength injection-locking. The signal is injected into a laser diode with its wavelength matched to a longitudinal mode of the laser diode. The optical signal can be either in continuous wave (CW) form or in pulse mode form.

The laser diode aligns the varying states of polarization of the optical signal by acting as an intensity compensating polarizer. If the wavelength of the signal matches one of the longitudinal modes of the laser diode the transverse electric (TE) component is amplified and its intensity is stabilized while transverse magnetic (TM) components are absorbed. Thus, the laser diode functions as an intensity compensating polarizer with a transverse electric (TE) polarized output.

FIGS. 6*a* and 6*b* show the output spectra of a Fabry-Pérot laser diode (FP-LD) when injected by a TE and a TM polarized wavelength-tunable optical signal respectively. The injected signal power is −17 dBm and the wavelength is step is 0.01 nm. FIG. 6*a* shows a typical injection-locking characteristic while FIG. 6*b* shows a typical reflection spectrum of a FP cavity. The peak of the output spectrum in FIG. 6*a* occurs when the injected optical signal is spectrally aligned with a TE longitudinal mode of the FP-LD. The absorption minimum in FIG. 6*b* occurs when the injected optical signal is aligned with a TM longitudinal mode of the FP-LD. Therefore, for any injected signal that is spectrally aligned with a wavelength at which the TE and the TM modes of the FP-LD coincide, the TE component of the injected signal will be amplified with its intensity clamped and stabilized by injection-locking if the power of the TE component is above the injection-locking threshold. The TM component, however, is always suppressed. As a result, an injection-locked FP-LD acts as an intensity-compensating polarizer with TE polarized output.

Figure 7:
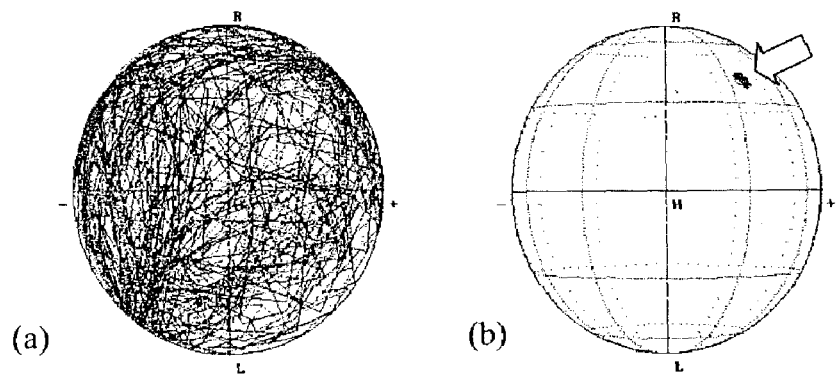
FIGS. 7a and 7b illustrate the Poincaré spheres for polarization-scrambled signals before and after injection-locking.

FIG. 7*a* depicts the Poincaré sphere representation of the SOP of a CW signal with a power of −17.9 dBm. When the polarization of the CW signal is varied randomly by hand using a polarization scrambler, the SOP wanders randomly over the Poincaré sphere. Referring to FIG. 7*b*, after injection-locking of the FP-LD, the SOP of the FP-LD output is confined to a small spot on the Poincaré sphere even when the polarization state of the CW signal is varied randomly. The applied current of the FP-LD is 1.6 times the threshold current ($1.6 \times I_{th}$). The degree of polarization (DOP) for the output signal after polarization stabilization is over 95% at a FP-LD current of 2.2 times the threshold current.

The Fabry-Pérot laser diode (FP-LD) used in the above examples supports both TE mode and TM mode emission during lasing but the double-channel planar-buried heterostructure of the FP-LD favors the TE mode. The power of the TM mode is less than 0.1%.

In order to re-align the polarization of a high bit-rate signal it is necessary to simultaneously inject a continues wave stabilizer signal and the input high bit-rate signal into the laser diode such that mutual injection-locking of the laser diode occurs. The functions of the continues wave stabilizer signal are to suppress the laser diode modes during the "0" bits of the high bit-rate input signals and to increase the response speed of polarization control by shortening the fall-time of the compensated signal under stimulated emission.

Figure 1:
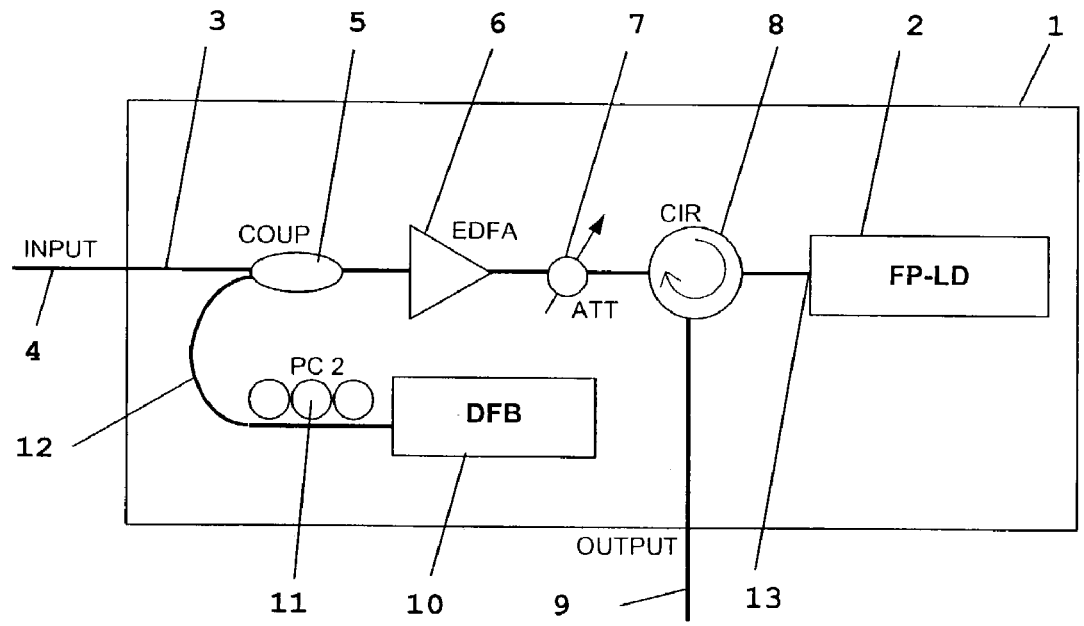
FIG. 1 is a schematic illustration of polarization controller according to the invention.

Referring to FIG. 1, an example of a apparatus of the invention comprises a mutual injection-locked laser diode (MILD) 1 which includes a Fabry-Pérot laser diode (FP-LD) 2 with drive electronics (not shown). Input 13 of the FP-LD 2 receives an injected optical signal along an input transmission path 3 from MILD input 4. The transmission path 3 includes an Intensity Coupler (COUP) 5, and Erbium Doped Fiber Amplifier (EDFA) 6, an Attenuator (ATT) 7 and a Circulator (CIR) 8. The Circulator 8 separates the polarization controlled signal from the input signal of the FP-LD 2 and directs it to MILD Output 9. A distributed feedback (DFB) laser 10 and polarization controller (PC) 11 provide a Continuos wave stabilizer signal 12, which is also feed the input transmission path 3 of the FP-LD 2.

Figure 2:
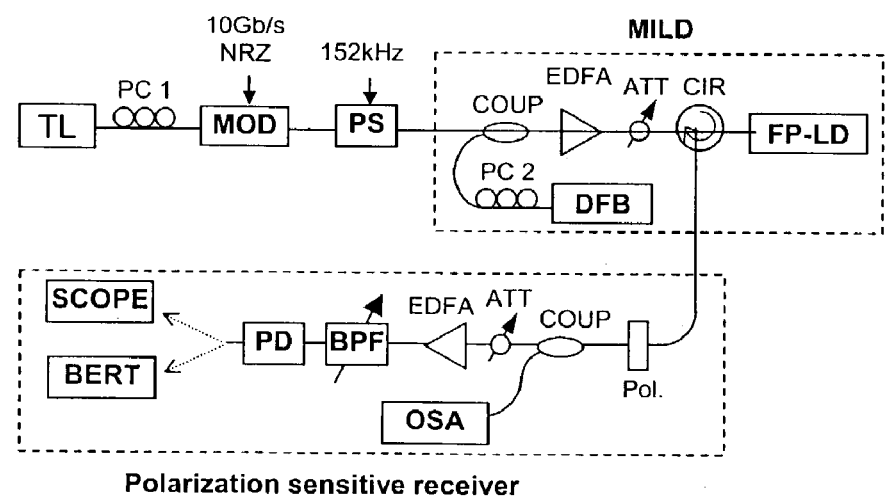
FIG. 2 is a schematic illustration of an experimental setup for polarization control of a 10 Gb/s non return to zero optical signal.
Figure 8:
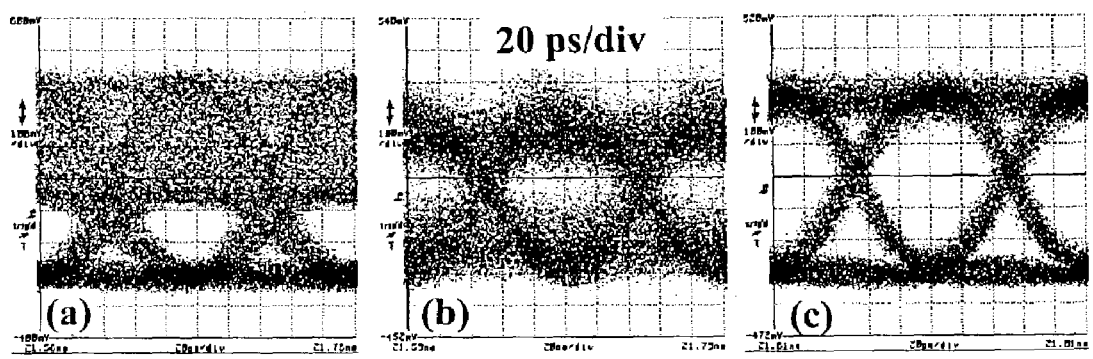
FIGS. 8*a* to 8*c* shows the eye-diagrams of a polarization scrambled 10 Gb/s signal without injection locking, with single wavelength injection locking and with mutual injection locking with a continuous wave (CW) stabilizer signal.

Four experiments have been carried out to demonstrate the performance of the invention on polarization stabilizing CW signals and pulsed signals, the results are described as follows:

FIG. 2 depicts the experimental setup for the polarization compensation of a 10 Gb/s NRZ signal using a MILD according to the invention. A 10 Gb/s signal is generated by externally modulating the 1546.6 nm signal from a tunable laser. The SOP of the modulated signal is varied by a polarization scrambler (PS) which operates at a sinusoidal frequency of 152 KHz. FIG. 8a shows the eye-diagrams of a polarization-scrambled signal measured by a photodiode (PD) after passing through a polarizer (Pol).

The polarization-scrambled signal is injected into the MILD. The wavelength of the CW stabilizer signal emitting by the DFB laser is 1548.7 nm. The FP-LD current is 1.5 times the threshold current ($1.5I_{th}$). The FP-LD and the DFB are thermally tuned such that the polarization-scrambled signal and the CW stabilizer signal are within the injection-locking range of two different FP modes. The power of the 10 Gb/s polarization scrambled signal and the CW stabilizer signal are 0.73 dBm and −4.69 dBm respectively. FIG. 8b shows the polarization scrambled 10 Gb/s signal after it is injection-locked to one of the FP modes without the stabilizer signal. Although re-polarization occurs as shown by the partial opening of the eyes, the intensity levels of the "1" and "0" are still rather noisy.

In order to achieve better re-polarization the CW stabilizer signal, which is wavelength matched to another FP mode, is injected simultaneously with the 10 Gb/s polarization scrambled signal such that mutual injection locking occurs. FIG. 8c gives the eye diagram of the polarization scrambled 10 Gb/s signals after simultaneous injection with the CW stabilizer signal. Better eye-opening, and the re-polarization, is observed.

Figure 9:
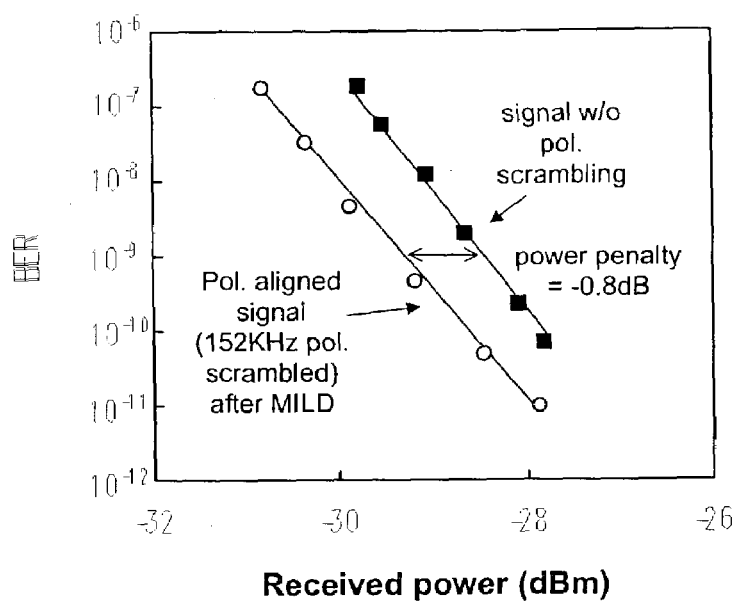
FIG. 9 shows the Bit Rate Error (BER) performance for the 10 Gb/s input signal without polarization scrambling (square data points), and scrambled and re-polarized (circle data points).

FIG. 9 shows the Bit Error Rate (BER) performance (measured after a polarizer) of the 10 Gb/s signal before polarization scrambling (square data pints) and after scrambling and re-polarization (circular data points). There is a −0.8 dB power penalty improvement compared to the original signal without polarization scrambling due to noise suppression under injection-locking.

Figure 10:
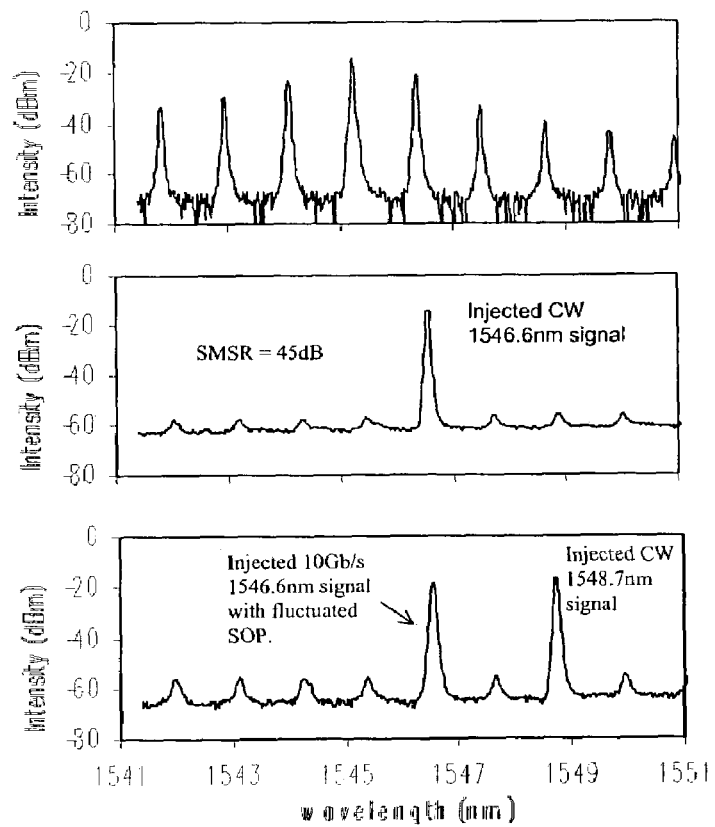
FIG. 10 shows the spectra for a FP-LD (top graph), injection-locked FP-LD with a CW 1546.6 nm signal (middle graph), and a dual wavelength injection-locked FP-LD with a 10 Gb/s 1546.6 nm polarization fluctuated signal and a CW 1548.7 nm signal (bottom graph).

Referring to FIG. 10, the top graph shows the spectra for a FP-LD, the middle graph shows the injection-locked FP-LD with a CW 1546.6 nm signal, and the bottom graph shows a dual wavelength injection-locked FP-LD with a 10 Gb/s 1546.6 nm polarization fluctuated signal and a CW 1548.7 nm signal. The side-mode suppression ratio of the polarization compensated signal is over 45 dB. The output of the MILD is TE polarized. Specific SOP can be obtained using a segment of polarization maintaining fiber or a slow polarization controller at the output of the MILD.

Figure 3:
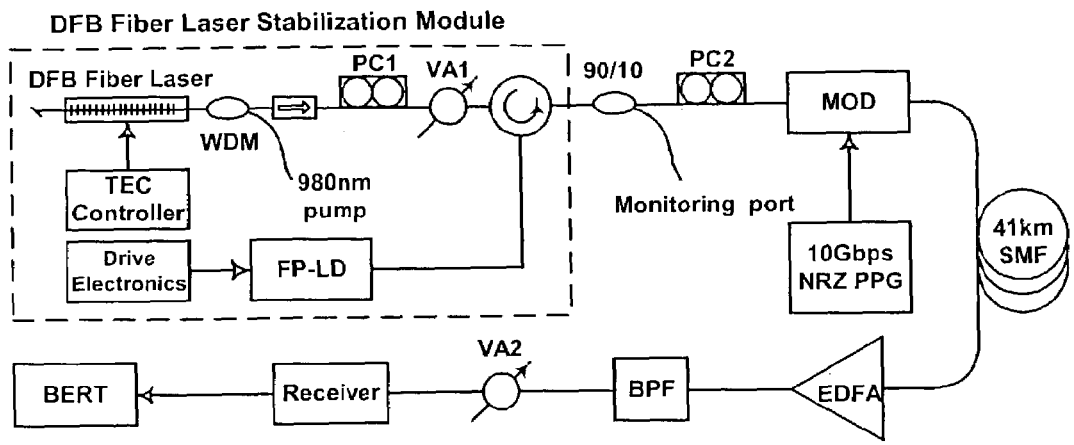
FIG. 3 is a schematic illustration of an experimental setup for polarization control of a Fiber Distributed Feedback (DFB) laser.

FIG. 3 shows the experimental configuration used to demonstrate the stabilization of the polarization of a DFB-FL output. The measured lasing wavelength and linewidth of the DFB-FL were 1551.5 nm and less than 500 kHz respectively. The measured linewidth was limited by the spectral linewidth of the tunable diode laser used for heterodyne beating.

Figure 11:
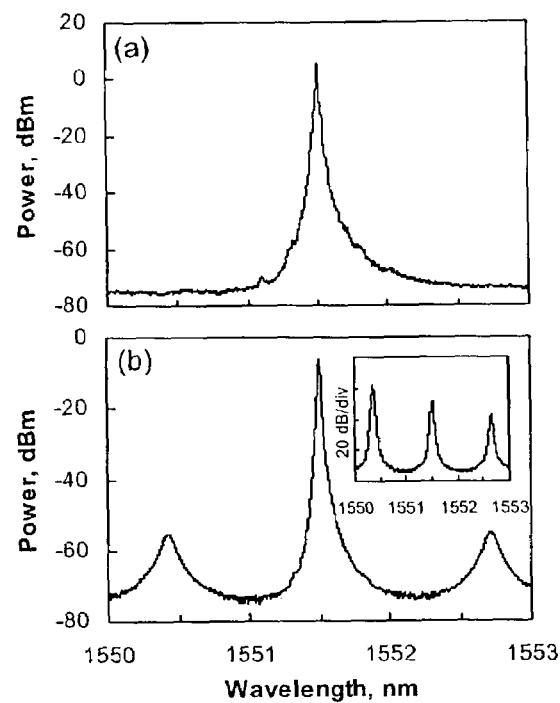
FIGS. 11*a* and 11*b* shows the optical spectra of a DFB-FL and Injection locked FP-LD. The insert is the spectra of the FP-LD not injection locked.
Figure 12:
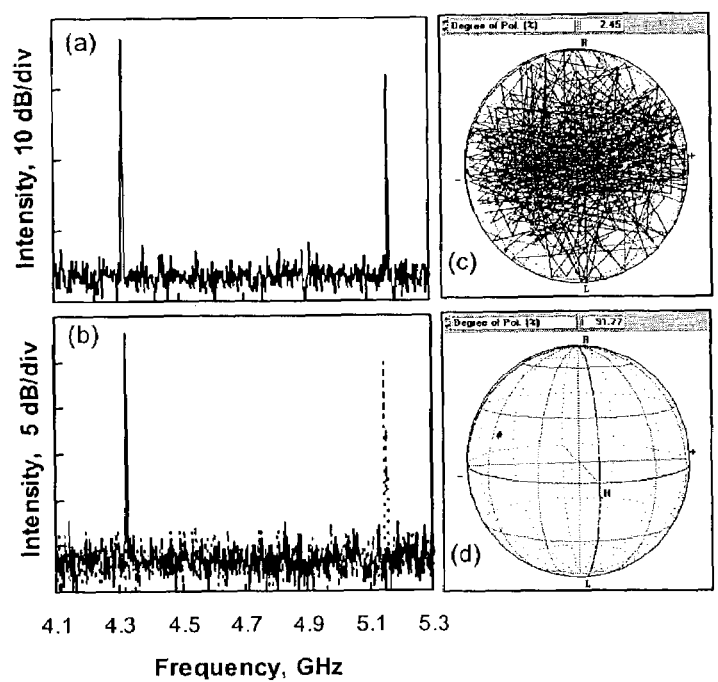
FIGS. 12*a* and 12*b* shows the RF beating spectra of a DFB-FL without injection locking, showing dual polarization output, and with injection locking, showing single output polarization output (solid or dashed trace).
FIGS. 12*c* and 12*d* show the measured Poincaré spheres for a DFB-FL output showing fluctuation in the state of polarizations without FP-LD and stable state of polarizations with FP-LD.

FIG. 11a shows the output spectrum of the DFB-FL. The output power and side mode suppression ratios (SMSR) of the DFB-FL were measured to be 5 mW and 75 dB, respectively. The pump power of the 980 nm pump laser was 70 mW. Dual polarization operation was confirmed by heterodyning with a single mode external cavity tunable diode laser using a fast detector. A frequency difference of 850 MHz is observed between the two polarization modes as shown in FIG. 12a, which implies the effective birefringence of the DFB-FL is $6.37 \times 10^{-6}$.

The output of the DFB-FL is injected in to the FP-LD using a polarization independent circulator. The injection locked signal from the output port of the circulator is monitored at the monitoring port. The FP-LD was a double channel planar buried heterostructure (DC-PBH) type diode laser with center wavelength of 1548.7 nm and a threshold current ($I_{th}$) of 11 mA. FIG. 11b shows the spectrum at the monitoring port which demonstrates the effect of injection locking. The inset is the original FP-LD spectrum. Injection locking is achieved by fine-tuning the spectrum of the FP-LD by varying temperature. When injection locking was achieved, the mode located at 1551.5 nm was amplified by 25 dB. All side-modes are strongly suppressed by 20 dB and they are also red-shifted by 0.07 nm. The SMSR of the injection-locked output was 45 dB which can be improved to about 65 dB by filtering the output with a thin-film bandpass filter. The linewidth of the injection locked output is narrower than the linewidth of the original FP-LD. Heterodyning the injection locked laser with an external cavity tunable diode laser showed that either one of the polarization modes (shown by the solid and dashed lines in FIG. 12b) of the DFB-FL can be selected to operate by adjusting the polarization controller (PC1).

Polarization characteristics of the original DFB-FL and the injection locked laser were measured by a polarization analyzer (Profile PAT 9000B). FIG. 12c shows the state of polarization (SOP) of the original DFB-FL on a Poincaré sphere. The measurement period was 30 seconds and the sampling rate was 30 Hz. The degree of polarization (DOP) was measured to be 2.45% and the SOP was unstable throughout the measuring duration. However, the SOP of the injection locked laser was very stable over the same time interval and the DOP was 91.77% as shown in FIG. 12d. This can be explained by considering the FP-LD is an internally strained semiconductor laser operating in single transverse electric (TE) polarization. When one of the polarization modes of the DFB-FL is aligned to the TE mode of the FP-LD it will be strengthened resonantly by the injection locking effect whereas the other orthogonally aligned polarized mode will be strongly diminished.

Figure 13:
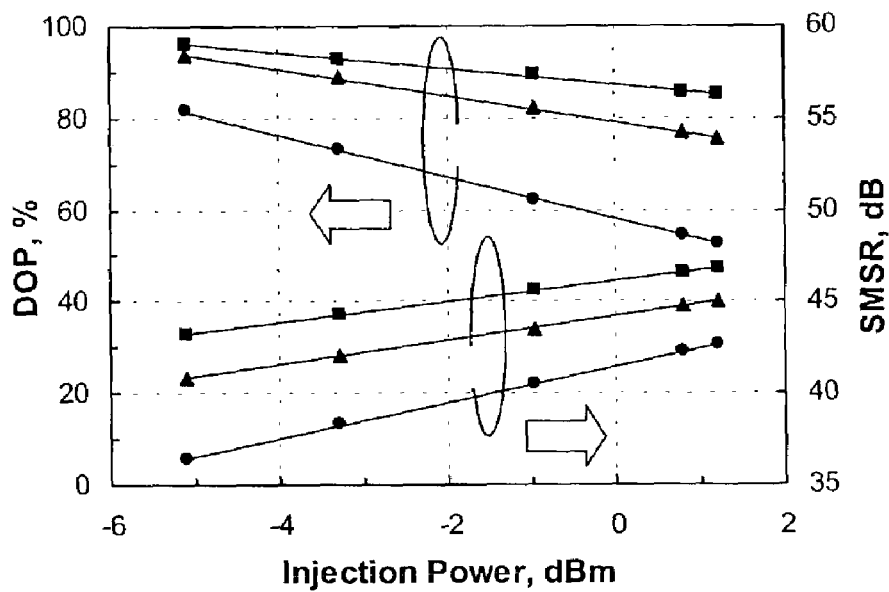
FIG. 13 shows the test results for the degree of polarization (DOP) and side mode suppression ratio (SMSR) as a function of injection power (output power of the DFB-FL) with different FP-LD bias current. 1.8 time threshold current ($1.8I_{th}$) is shown by square data points, $1.45I_{th}$ is shown by triangle data points, and $1.1I_{th}$ is shown by circle data points.

To study the injection locking phenomenon, different bias currents were applied to the FP-LD and the output power of the DFB-FL was varied. FIG. 13 depicts the measured DOP and SMSR as a function of the injection power by adjusting the variable attenuator (VA1) which changes the power output from the DFB-FL, with three different bias currents ($1.1I_{th}$, $1.45I_{th}$ and $1.8I_{th}$) of the FP-LD. The side-modes power decreases (i.e. increase in SMSR) when the injection power or the FP-LD bias current increases. SMSR of 47 dB was obtained with the injection power of 1.2 dBm and FP-LD biased at $1.8I_{th}$. The DOP, on the other hand, increases when FP-LD bias current increases but decreases when injection power increases. This can be explained by considering that due to the geometrical structure of the FP-LD, its output is a single polarization mode and when the effect of injection locking reduces via the decrease in power of the DFB-FL, the output of the circulator becomes dominantly a single polarization mode. Therefore, optimization between the bias current of the FP-LD and the injection power of the DFB-FL is required in order to optimize the DOP and SMSR of the injection locked laser.

The results show that the FP-LD acts as a polarization filter as well as an amplifying medium for the DFB-FL when it is injection-locked.

Figure 6:
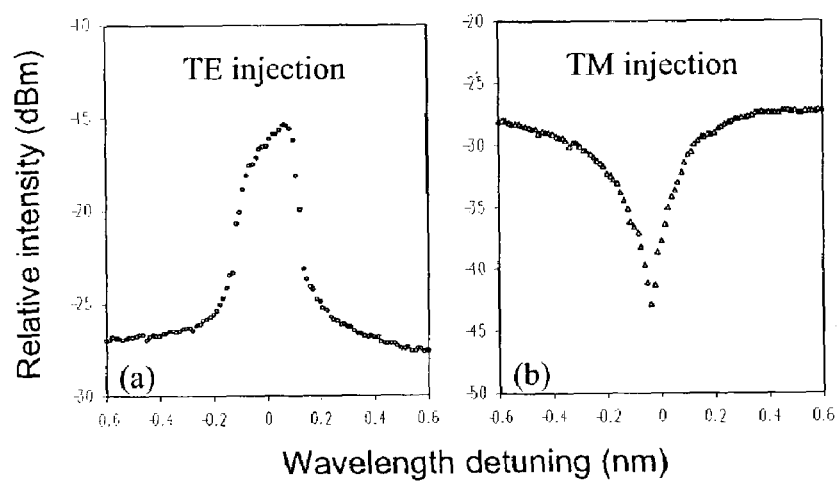
FIGS. 6a and 6b graphically illustrate the output spectra of a Fabry-Pérot laser diode (FP-LD) when injected with continues wave signals at different wavelengths.
Figure 14:
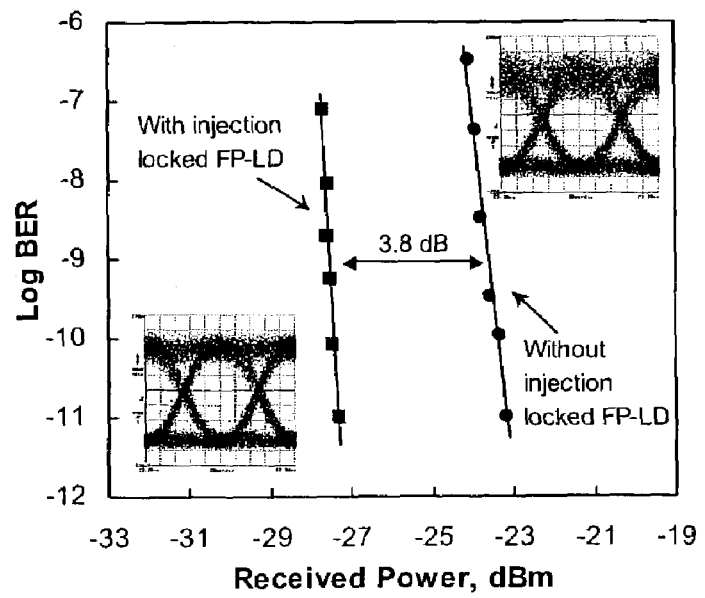
FIG. 14 shows BER and eye diagrams of the FP-LD with and without injection locking.

The transmission performance of using only the DFB-FL and then the injection locked FP-LD/DFB-FL as sources were compared by the experiment setup shown in FIG. 3. The injection power of the DFB-FL was set to −5 dBm and the bias current of the FP-LD was 20 mA ($1.8I_{th}$), the corresponding DOP and SMSR of the injection locked laser output were 97% and 43 dB. The upper right inset of FIG. 14 shows the 10 Gb/s NRZ externally modulated eye diagram when only the DFB-FL is used. The lower left inset of FIG. 14 shows the 10 Gb/s NRZ externally modulated eye diagram when the injection locked laser is used. The eye diagrams were recorded by a sampling oscilloscope operated in 10-second persistence mode. The dual polarization output of the DFB-FL causes amplitude jitter after the polarization sensitive modulator and leads to partial eye closure. An open eye was obtained from the injection locked laser for its highly polarized output. The lasers were then modulated by $2^{31}-1$ pseudo random bit sequence and bit error rates (BERs) were recorded after transmitting through 41 km standard single mode fiber. FIG. 6 shows the BERs of the two different configurations. 3.8 dB power penalty improvement was achieved with BER of $10^{-9}$ when the injection locked output was transmitted.

Figure 4:
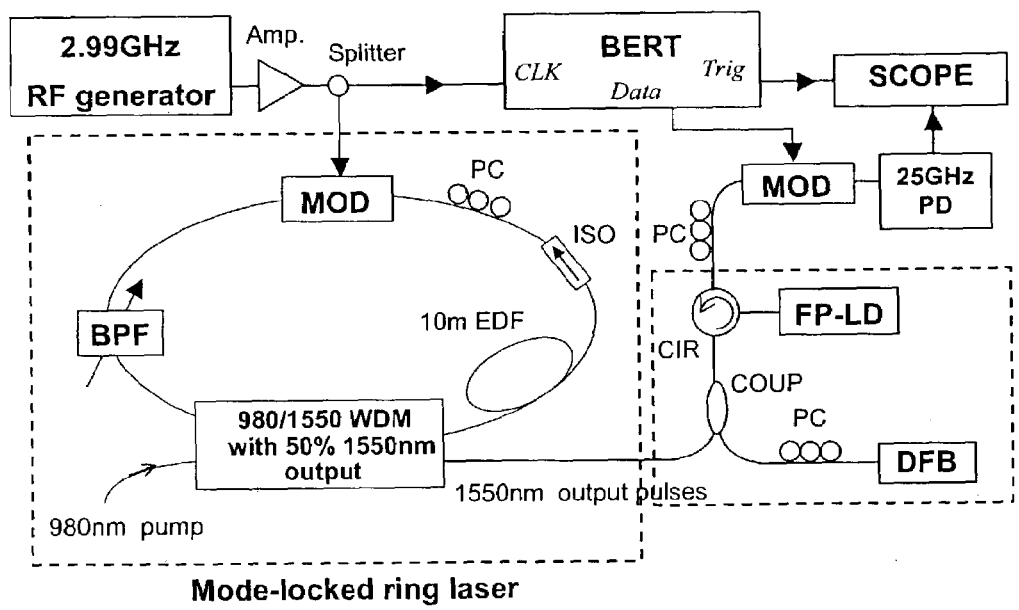
FIG. 4 is a schematic illustration of an experimental setup for all-optical polarization stabilization of a high speed pulse train generated from a mode-locked ring laser.

FIG. 4 shows the configuration to stabilize the polarization of the output pulses from an active mode-locked fiber ring laser (MFRL). The operation wavelength, repetition rate and average output power are 1554.9 nm, 2.99 GHz and ≈–10 dBm, respectively. The pulsewidth, measured by autocorrelation, is 5 ps. The SOP of the MFRL output fluctuates randomly because non-polarization-maintaining fibers are used to construct the cavity of the MFRL. Detection using a polarization insensitive photodiode showed that the intensity of the MFRL output is stable.

Figure 15:
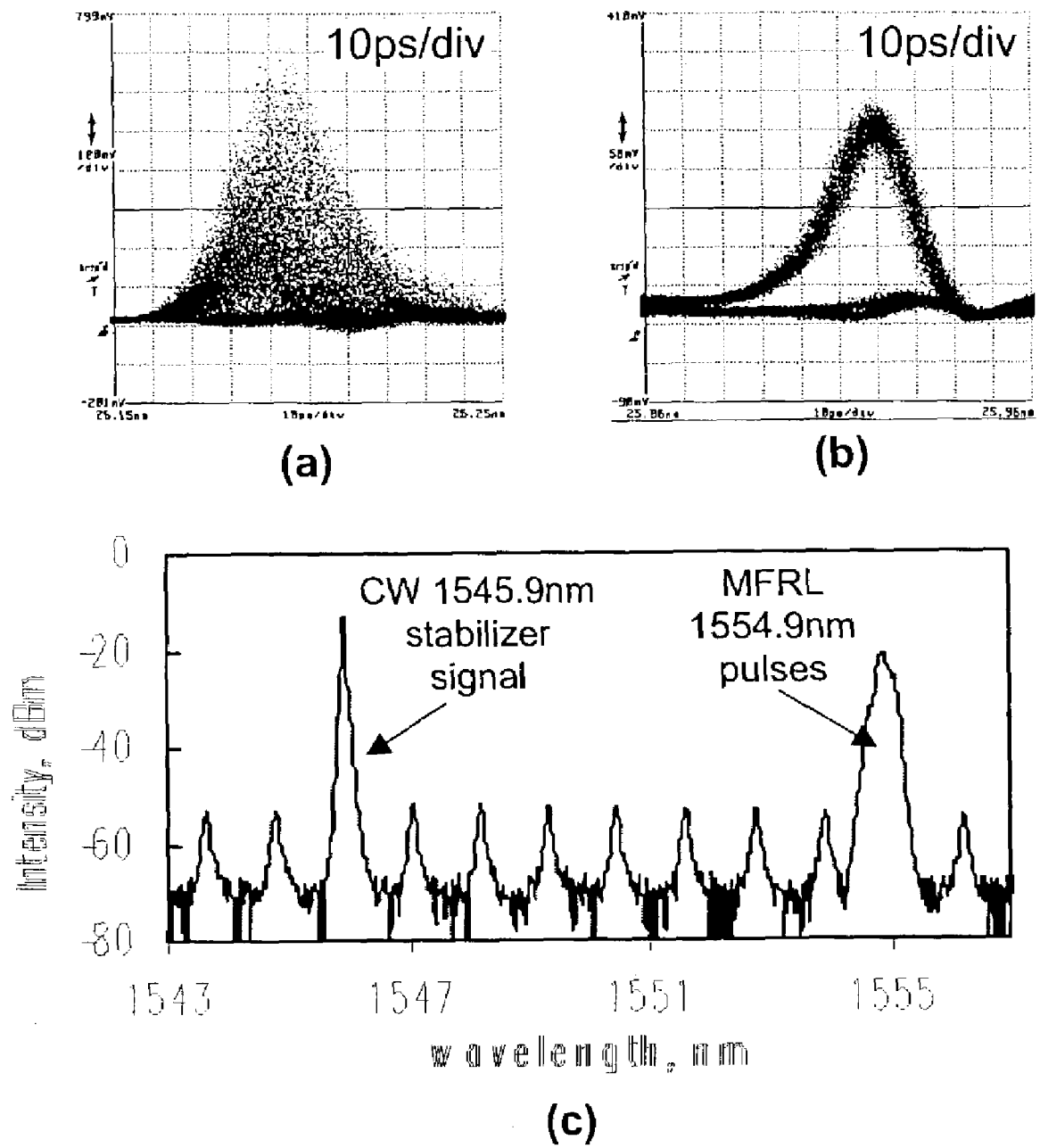
FIGS. 15*a* and 15*b* show the measured eye diagrams of the mode-locked fiber ring laser output after external modulation and corresponding spectrum without MILD and with MILD.
FIG. 15*c* shows the spectrum of the mode-locked fiber ring laser output showing 1554.9 nm mode-locked fiber ring laser pulses and CW 1545.9 nm stabilizer signal under mutual injection-locking by the FP-LD.

FIG. 15 shows the eye-diagram of the MFRL output after modulation by a polarization-dependent Mach-Zehnder modulator with a synchronous 2.99 Gb/s pseudo-random $2^{31}-1$ bit sequence. The eye closure is due to the randomly varying SOP of the MFRL output. The MILD used in this experiment consists of a FP-LD with a bias of $1.5I_{th}$ thermally tuned to match the wavelength of the MFRL output, a DFB laser used to generated the CW stabilizer signal at 1545.9 nm with a power of –4 dBm, and a circulator used to separate the output polarization compensated signal from the input signals of the FP-LD (FIG. 4). By thermally adjusting the FP-LD such that one of the FP-LD modes is wavelength-matched to the MFRL pulses within injection-locking range of ~0.2 nm on the longer wavelength side, mutual injection-locking between the mode-locked pulses and the CW stabilizer signal occurred in the FP-LD (FIG. 15c). The polarization stabilized pulses were then modulated. FIG. 15b shows an open eye-diagram without significant pulse broadening. The pulsewidths from FIG. 15a and 15b are 17 ps which is the resolution limit of the photodiode (PD) used in the experiment. The side-mode suppression ratio (SMSR) of the polarization compensated signal is over 40 dB. In practical realizations of the polarization stabilization method, a thin-film filter should be inserted after the MILD to eliminate the stabilizer signal to increase the SMSR of the compensated signal to over 60 dB.

Figure 5:
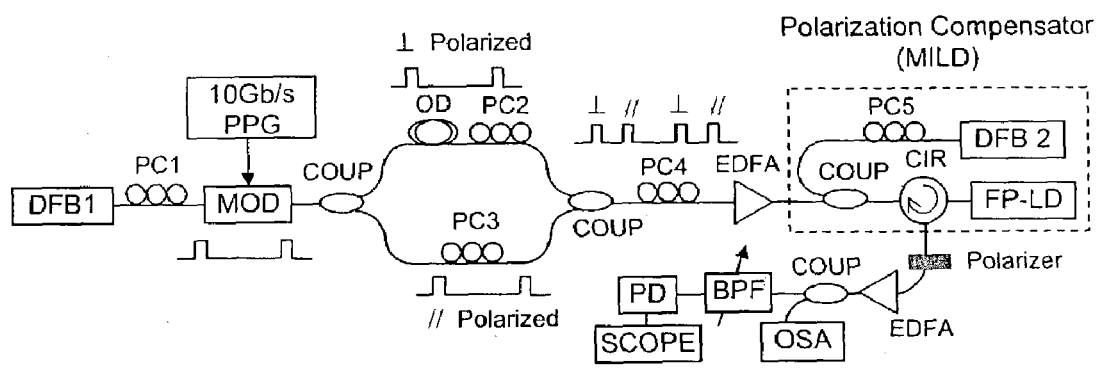
FIG. 5 is a schematic illustration of an experimental setup for testing the speed of polarization stabilization of the invention using pulse-train with alternative orthogonally-polarized pulses.
Figure 16:
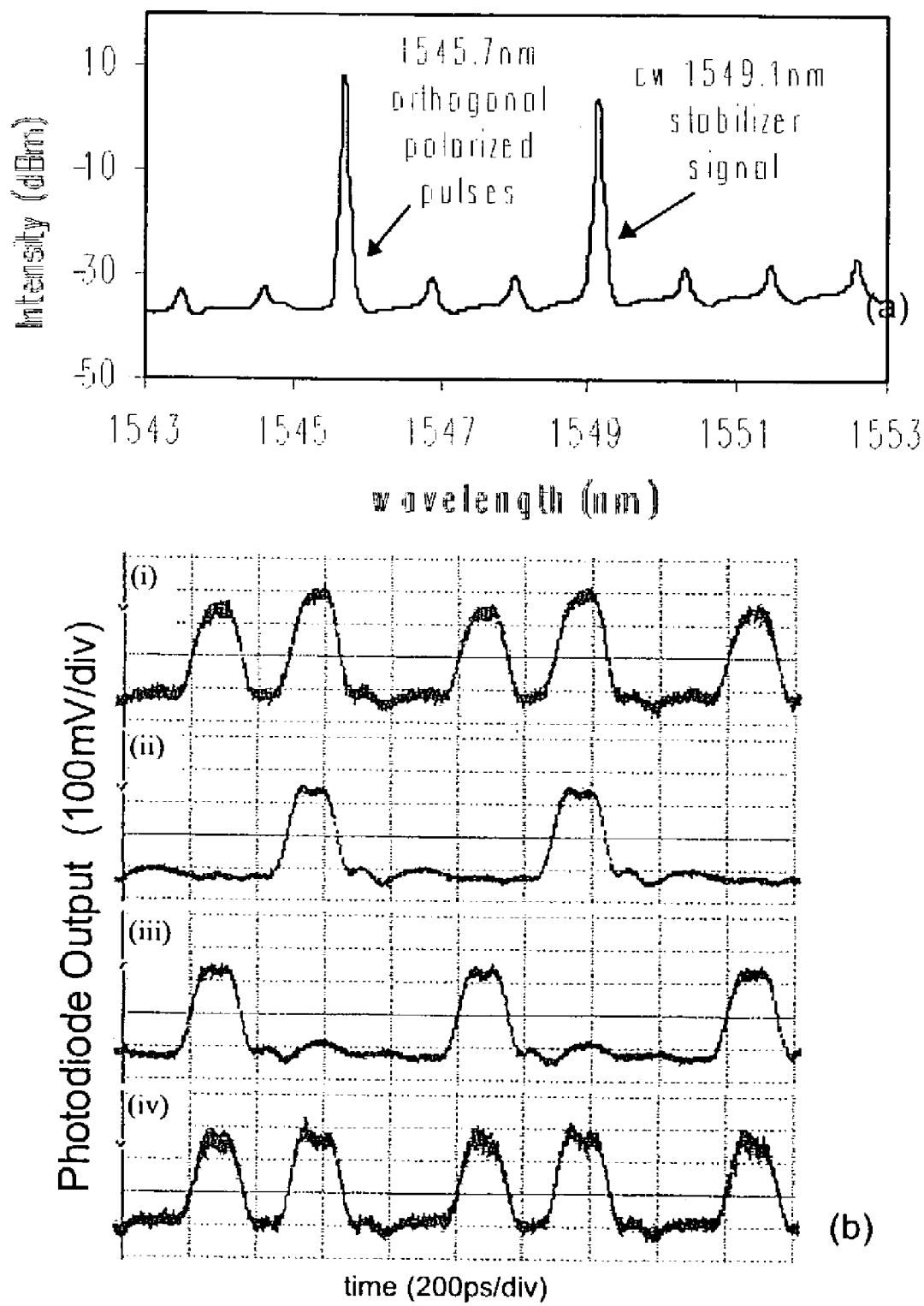
FIG. 16*a* shows the spectrum for the mutual-injection locked FP laser.
FIGS. 16*b*(i) to 16*b*(iv) show temporal profiles for: (i) the combined pulse-train with orthogonal polarization, (ii) pulse-train after the polarizer, (iii) same pulse-train by rotating the polarizer with 90° and (iv) polarization-aligned pulse-train after polarizer.

FIG. 5 shows the experimental setup to test the speed of the proposed polarization controller. Pulse pairs 200 ps apart, in orthogonal polarizations, and at 1546.7 nm were generated and injected simultaneously with a 1549.1 nm (DFB2) CW stabilizer signal into a FP-LD. The orthogonality between the SOPs of the pulse pairs (controlled by PC3 and PC4) was confirmed by measurement of their temporal profiles after a polarizer as shown in FIGS. 16b(ii) and 16b(iii). The bias current of the FP-LD was $2I_{th}$, and the injected powers of the orthogonally polarized pulse pairs and the CW stabilizer signal were is 4.27 dBm and –0.78 dBm respectively. In order to align the SOPs of the pulse pairs using the MILD, the injected power for the TE component of the signal should be larger than the injection-locking threshold which was done by adjusting PC4 in the experiment.

FIG. 16b(iv) shows that the SOPs of the orthogonally polarized pulse pairs were aligned after mutual injection-locking of the FP-LD (FIG. 16a). The side-mode suppression ratio and the degree of polarization of the polarization aligned signals were measured to be over 40 dB and 90% respectively.

According to the invention an active injection locking technique is employed by injecting the output of a DFB-FL into a FP-LD, wherein the wavelength of the DFB-FL matches one of the longitudinal modes of the FP-LD. Furthermore, by adjusting the operating current of the FP-LD and the output power of the DFB-FL, near linear polarized laser is achieved with DOP larger than 95% and SMSR higher than 45 dB. The performance of the resulting source using this technique is comparable with that of semiconductor DFB laser diodes used for optical communication purposes.

The technique of the invention can also eliminate the amplitude jitter of an externally modulated DFB-FL. The above test results indicate that a highly polarized multi-wavelength source can be realized by injection locking of a single low-cost FP-LD with several fiber lasers, which will find potential application in DWDM system as well as component characterization.

The invention demonstrates a practical method for polarization compensation of high speed signals e.g. 10 Gb/s NRZ signal and mode-locked RZ pulses, using a mutual injection-locked laser diode (MILD) In the MILD, the wavelength of the injected polarization-fluctuated signal is wavelength matches with one of the longitudinal modes of the FP-LD. The invention can repolarize high speed data signal without converting the SOP variation into amplitude jitter. Therefore, the invention has application to the deployment of optical switches and wavelength converters, add-drop multiplexers, polarization-multiplexed systems and coherent detection systems in optical networks.

Where in the foregoing description reference has been made to integers or elements have known equivalents then such are included as if individually set forth herein.

Embodiments of the invention have been described, however it is understood that variations, improvement or modifications can take place without departure from the spirit of the invention or scope of the appended claims.

What is claimed is:

1. A method of controlling the state of polarization of a coherent optical signal having transverse electric and transverse magnetic components including injecting the coherent optical signal into a laser diode having a constant excitation current, and wherein the wavelength of the coherent optical signal is matched to a longitudinal mode of the laser diode such that the transverse magnetic component of the coherent optical signal is suppressed and the laser diode output matches the transverse electric component of the optical signal.

2. A method of controlling the state of polarization of an optical signal having a first wavelength including injecting the optical signal into a laser diode and simultaneously injecting a stabilizer signal having a second wavelength into the laser diode, wherein the first wavelength matches a first longitudinal mode of the laser diode and the second wavelength matches a second longitudinal mode of the laser diode.

3. The method of claim 2 wherein the optical signal has a continuous wave form or a pulse mode form.

4. The method of claim 2 wherein the laser diode is a Fabry-Perot laser diode.

5. The method of claim 2 wherein the laser diode has an injection-locking power threshold and the optical signal has a transverse electric power component larger than the injection-locking power threshold of the laser diode.

6. An apparatus for controlling the state of polarization of an optical signal including:
   an input for receiving an optical input signal having a wavelength,
   an output,
   a laser diode having a longitudinal mode matching the optical signal wavelength and providing a polarization controlled output signal,
   a light transmission path from the input to the laser diode,
   a separator positioned in the light transmission path for separating the polarization controlled output signal from the optical input signal and directing the polarization controlled output signal to the output, and
   a optical signal source for providing a continuous wave optical signal, wherein the continuous wave optical signal is introduced into the transmission path between the input and the separator simultaneously with the optical signal at the input.

7. The apparatus of claim 6 wherein the continuous wave optical signal has a wavelength matched to a second longitudinal mode of the laser diode.

8. The method of claim 1 wherein the excitation current is greater than 1.5 times a threshold current of the laser diode.

9. A method in an apparatus for controlling the state of polarization of an optical signal, the apparatus having an input, an output, a laser diode having first and second longitudinal modes and an optical output, a light transmission path from the input to the laser diode, a separator positioned in the light transmission path for separating the laser optical output from an optical input and directing the laser optical output to the output, and an optical signal source for introducing an optical stabilizer signal into the transmission path between the input and the separator,
   the method comprising injecting an optical input from the input into the laser diode, wherein the wavelength of the optical input is matched to the first longitudinal mode of the laser diode such that a transverse magnetic component of the optical input is suppressed and the laser optical output matches the transverse electric component of the optical input, and simultaneously injecting an optical stabilizer signal in to laser diode, wherein a wavelength of the optical stabilizer signal matches the second longitudinal mode of the laser diode.

* * * * *